Oct. 14, 1952   B. S. MINOR   2,613,981
HOOK

Filed May 2, 1947   2 SHEETS—SHEET 1

INVENTOR.
BURT S. MINOR
BY
Mason & Graham
ATTORNEYS

Oct. 14, 1952   B. S. MINOR   2,613,981
HOOK
Filed May 2, 1947   2 SHEETS—SHEET 2
FIG. 4.
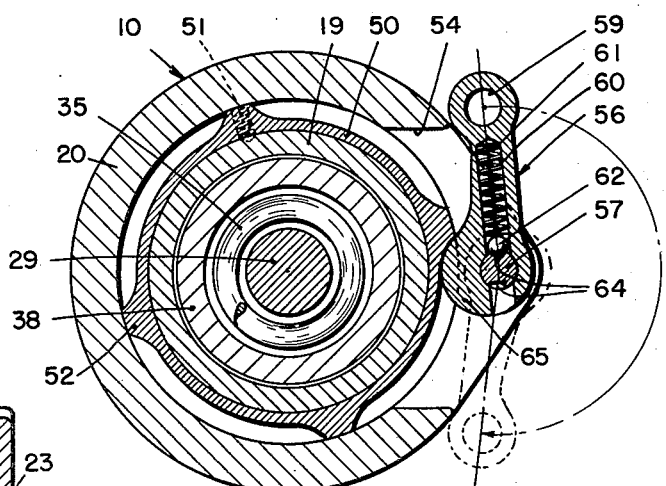
FIG. 3.
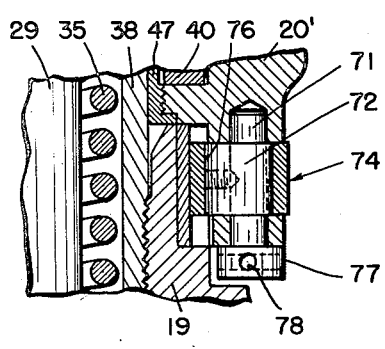
FIG. 5.
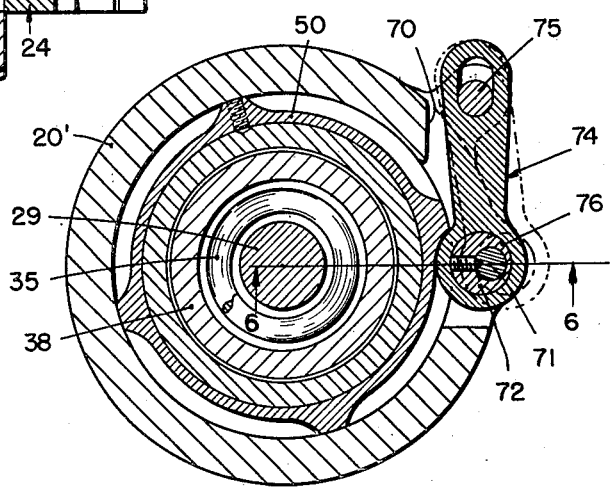
FIG. 6.
INVENTOR.
BURT S. MINOR
BY
Mason & Graham
ATTORNEYS Patented Oct. 14, 1952

2,613,981

UNITED STATES PATENT OFFICE 2,613,981

HOOK

Burt S. Minor, Whittier, Calif., assignor to Regan Forge and Engineering Company, San Pedro, Calif., a corporation of California Application May 2, 1947, Serial No. 745,475

7 Claims. (Cl. 294—82)

This invention relates generally to hooks, and particularly hooks used in the drilling of oil wells by the rotary drilling method.

In rotary well drilling it is customary to employ a hook attached to the traveling block for suspending the rotary swivel and drill pipe during well drilling operations and for suspending the elevator when pipe is being run in or withdrawn from the well hole. In recent years what may be termed triple hooks have been used which include a relatively large main hook for carrying the rotary swivel and attached drill pipe, or in other words, the heavier loads, and a pair of smaller auxiliary hooks in the form of a double bight yoke for suspending the elevator by its two links. It is an object of this invention to provide a novel improved hook of this triple hook type.

It is a particular object of the invention to provide in a hook of the type indicated means for resiliently suspending both the main hook and the auxiliary hooks or yoke in such a manner that, when used, relatively light loads may be suspended from the yoke under relatively light tension and relatively heavy loads suspended from either the yoke or the main hook under relatively greater tension. In this connection, it is an object to provide a hook embodying a dual spring construction in which a light spring is employed for suspending the yoke and a heavier spring is used for suspending the main hook. It is a further object to provide a construction whereby the load on the yoke, if it exceeds a given amount, will be transferred to the main hook and carried by the heavier spring.

It is a still further object to provide a construction whereby, if the total load on any of the hooks exceeds a given amount, the excess of the load over such amount will be directly supported by the body of the hook independently of the spring means thereof. In this connection, it is a particular object of the invention to provide a construction embodying spring means for resiliently suspending the hooks wherein the spring means may be compressed only a limited amount, after which the load on the hook will be transferred to the body thereof without further stressing the springs.

It is also an object of the invention to provide a triple type hook in which a yoke, formed to provide a pair of auxiliary hooks, and mounted on a spring supported stem slidable in the body of the main hook cooperates with the main body of the hook in a manner to relieve any bending action on the yoke stem. It is a further object to provide a construction wherein the yoke is slidable in the body of the main hook and when subjected to a load exceeding a given amount will be received in the bight of the main hook and be supported thereby.

In connection with the rotary drilling of oil wells, it is necessary to have a hook which will rotate easily when running the drill pipe in the well when the added sections are being screwed together, and also means whereby the hook can be locked against rotation when the drill pipe is being withdrawn from the well and the sections are being disengaged by rotating the lower portion of the drill pipe suspended below the rotary table. It therefore is also an object of the invention to provide a swivel hook embodying means for locking the hook against rotation.

When a hook is locked against rotation it is also desirable to have available a substantial amount of backlash to enable the hook to be rotated backwardly sufficiently to lay down or pick up stands of pipe through the window of the derrick without having to unlatch the anti-swivel lock of the hook. In this connection it may be pointed out that the window of the derrick is usually positioned adjacent to the side of the derrick where the drill pipe sections stand. It therefore is also an object of the invention to provide anti-swivel means for a hook which permits of a limited amount of backlash or play once it is latched to lock against swiveling.

These and other objects will be apparent from the drawings and the following description thereof. Referring to the drawings, which are for illustrative purposes only:

Fig. 3 is a sectional plan view on line 3—3 of Fig. 2;

Fig. 4 is a sectional plan view on line 4—4 of Fig. 1;

Fig. 5 is a sectional plan view of a modified form of anti-swiveling device; and Fig. 6 is a fragmentary section on line 6—6 of Fig. 5.

Figure 2:
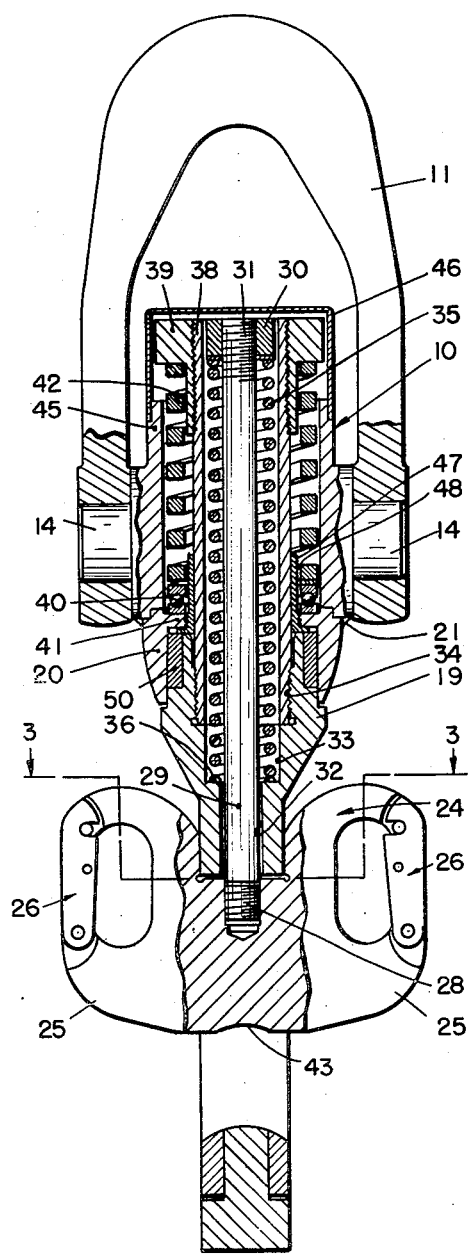
Fig. 2 is a sectional elevation on line 2—2 of Fig. 1.

More particularly describing the invention, reference numeral 10 generally indicates the swivel body of the hook to which is attached a bail 11 mounted on suitable trunnions 14. Below the body 10 is a main hook body 15 which includes a hook 16 having a suitable keeper 17 which is pivotally mounted at 18 and may be of any suitable construction and cooperate with any suitable latch mechanism for releasably securing the same in the closed position in which it is shown. The main hook body also includes a shank 19 extending into the lower portion of the swivel body formed by a ring 20 welded at 21 to body 10. The means for suspending the hook body will be described later. The body of the main hook is provided with a vertical slot 23 which slidably receives a yoke, generally indicated by 24, formed to provide a pair of hooks 25 provided with suitable keepers 26. The yoke, at one side, is formed to provide a pair of guide shoulders 27 (Fig. 3) which receive the marginal portion of the wall defining one side of the slot 23.

As previously indicated, it is a particular object of the invention to resiliently mount both the yoke 24 and the main hook, so that relatively light loads such as are carried by the elevator which is normally attached to the auxiliary hooks 25 of the yoke may be resiliently supported thereby and relatively heavier loads may be resiliently supported on the main hook. In order to accomplish this, the yoke 24 is mounted on the lower threaded end 28 of a stem 29. At its upper end the stem carries a nut 30 which is secured to threaded portion 31 of the stem, as shown. The shank 19 of the main hook body is bored at 32 to receive the stem. It is also provided with a counterbore 33 and a second counterbore 34. The yoke and stem are yieldably supported as a unit in the upper or normal position shown by means of a compression spring 35 which extends between the nut 30 and an inwardly extending shoulder 36 in the shank of the main hook body.

The shank of the main body is threaded in the counterbore 34 to receive a hollow stem 38 which is provided at its upper end with a nut 39 threaded thereon. Intermediate the nut and a thrust bearing 40 seated on a flange 41 of ring 20 is a relatively stiff or heavy spring 42 which serves to hold the hollow stem 38 and main hook body in the upward position shown.

It will be apparent that with the construction described, the yoke 24 is resiliently supported by the spring 35 up to the limit of travel of the yoke within the slot 23 in the main hook body. If a sufficiently heavy load is placed on the yoke to compress the spring substantially, the yoke will come to rest in the bight 16' of the main hook, the yoke being provided with a recess 43 for this purpose. Any weight in excess of the load required to compress the spring sufficiently to bring the yoke down to its lowermost position where it rests in the bight of the main hook will be transferred to the main hook and will be carried by the heavy spring 42. It will also be apparent that the interlocking construction of the yoke and hook body resulting from the provision of the guide shoulders 25 on the yoke, effectively relieves the stem 29 of any stresses tending to bend it.

Means are provided for preventing the compression of the main or relatively heavy spring 42 more than a limited amount. This means comprises an upstanding annular wall 45 which extends upwardly from the swivel body 10 to a point spaced a short distance below the nut 39 when the same is in the upward position. A removable cap 46 is mounted on the wall 45. Thus, as the nut 39 moves downwardly and if the weight on the hook is sufficient, it will abut the upper edge of the annular wall 45 and all excess weight over that necessary to compress the spring to this point will be directly carried by the swivel body.

It will be apparent that the assembly of the hooks and springs is ordinarily free to rotate within the swivel body on the bearing 40. It is desirable to provide a means of retaining lubricant at the bearing and to accomplish this an upstanding sleeve 47 is threaded into the ring 20 to provide an annular well 48 in the region of the bearing which can be supplied with lubricant through fitting 49.

Figure 1:
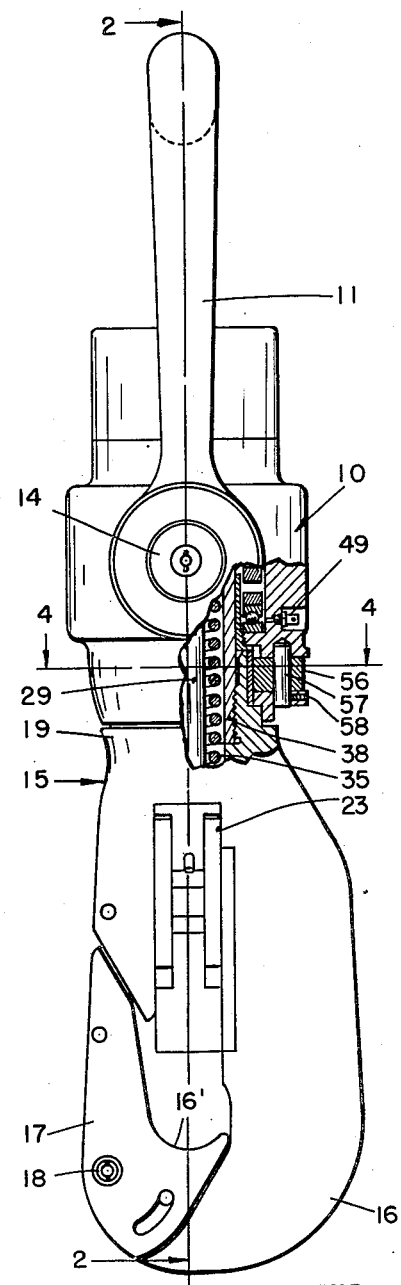
Fig. 1 is an elevational view, partly in section, of a hook embodying the invention.

As previously pointed out, it is desirable to provide a means for locking the parts against rotation and preferably such means should permit of limited backlash or play. One such means for accomplishing this is shown in Figs. 1, 4 and 5, wherein the shank 19 of the hook body is provided with a collar 50 which is non-rotatably secured thereto by means of a set screw 51. The collar is provided with any suitable number of substantially radially extending projections 52. The ring 20 of the swivel body is provided with an elongated slot or window 54 to accommodate a latch plate 56 pivotally mounted on a vertically extending pin 57 secured in the ring 20 by a set screw 58. The latch plate 56 includes a handle portion 59 bored at 60 to receive a spring 61 and ball 62 receivable within recesses 64 for releasably positioning the handle. The latch plate is provided with an eccentrically shaped portion 65 surrounding the pin 57 which is adapted to bear against a side of one of the projections 52 of the collar 50, as shown in Fig. 4, when the latch is in anti-swivel or locked position. It will be apparent that with the construction described any force tending to cause the hook to rotate clockwise of the device, as shown in Fig. 4, will more firmly lock the parts together. In this connection it may be noted that the handle of the latch plate when in latched or locked position bears against the side of the ring 20.

In Figs. 5 and 6 there is shown another form of latch structure wherein a ring 20' is provided with a slot or elongated window 70. Extending vertically in the member 20' is a pin 71 which is provided with an eccentric fixed sleeve 72. A latch plate 74, which is pivotally mounted on a pin 75, has a bore 76 which receives the eccentric sleeve 72. With the construction outlined it will be apparent that by rotating the pin 71 the latch plate 74 will be moved into or out of the latching or locking position in which it is shown in the drawing. The pin 71 may be provided with a head 77 having bores 78 to receive a tool for turning the same.

With respect to both forms of anti-swiveling means shown, it will be apparent that when the hook is locked against rotation in the normal or clockwise direction it may nevertheless be rotated a limited amount in a counterclockwise direction for the purpose of being used to pick up stands of pipe and the like, as previously explained.

It will also be apparent that the device provides a triple type hook in which two of the hooks as a unit are usable for carrying relatively light loads and imparting a relatively small amount of tension to them and that means are also provided for picking up heavier loads and having them resiliently supported with a greater degree of tension. Thus, normally, when the stands of drill pipe are being handled, the same are carried by the yoke to which the elevator is attached, in which case the innermost spring supplies the necessary tension required when making up and breaking out the threaded connections. When handling heavier sections of the drill stem, such as the drill collars on the bottom end just above the bit and the grief stem at the top end, greater spring tension as required to assist the threads during the making up and breaking out of the same is provided by the hook. This is accomplished in the following manner. When the heavier loads are suspended from the yoke member the same comes to rest in the bight of the main hook member and as the main hook member is supported by the outside or larger spring, this spring then comes into action and provides the necessary tension for making up and breaking out the threaded connections. In this connection it may be pointed out that it is unsatisfactory to utilize a hook which is resiliently mounted on one relatively heavy spring for handling the lighter portions of the drill stem, and the stands of drill pipe as the tension would be so great that it would be destructive to the last few engaging threads when the threaded joints were being broken or unscrewed.

Although the invention has been particularly shown and described, it is contemplated that various modifications and changes can be made without departing from the scope of the invention as set forth in the following claims.

I claim:

1. In a hook having a tubular swivel body and a hook member rotatably mounted in said body, interengaging means on said body and said hook member for limiting the hook member to a predetermined substantial partial rotative movement relative to said body, comprising means on said hook member forming two abutment shoulders spaced circumferentially a substantial distance and extending substantially radially thereof in the region of the body, and a latch element on said body opposite said shoulders mounted for movement into a position between said shoulders, said latch element occupying substantially less than the entire circumferential space between said shoulders when moved into position therebetween.

2. In a hook having a tubular swivel body and a hook member including a shank rotatably mounted in said body, latch means comprising means on said shank forming two circumferentially spaced abutment shoulders extending substantially radially of the shank, and a latch element pivotally mounted on said body on an axis parallel to the longitudinal axis of the axis of rotation of said shank at a point opposite the shank in the region of said shoulders, said latch element having an eccentrically shaped portion around its pivotal axis constructed and arranged to project radially inwardly of said body into the path of said abutment shoulders upon swinging movement of the latch element, said latch element having a handle element adapted to abut the swivel body when in latched position.

3. Latch means as defined in claim 2 in which the means on the shank forming spaced abutment shoulders comprises a collar mounted on said shank and secured against rotation relative thereto, having circumferentially spaced, radially extending projections forming abutment shoulders.

4. In a hook having a tubular swivel body and a hook member including a shank rotatably mounted in said body, latch means comprising means on said shank forming two circumferentially spaced abutment shoulders extending substantially radially of the shank, a rotatable pin mounted in said body opposite the shank in the region of said shoulders, said pin having an eccentric portion and being so mounted that the eccentric portion moves toward and away from said shank upon pivotal movement of the pin, a latch plate mounted in said body for movement toward and away from said shank and having a bore receiving the eccentric portion of said pin whereby rotation of said pin effects said movement of the latch plate, said latch plate being adapted to project inwardly toward said shank sufficiently to come within the path of said abutment shoulders and limit rotation of said shank.

5. In combination with a compound hook structure, a tubular swivel body, a suspension means on said body, hook members having shank members passing through said body in slidable relation therewith, said shank members being relatively axially movable, the hooks having inter-non-rotatable engaging means, and a latch member on the body engaging with one of said shank members.

6. In a hook having a tubular swivel body and a hook member including a shank rotatably mounted in said body, latch means, comprising a collar on said shank having two circumferentially spaced radially extending abutment shoulders, said collar being adjustable circumferentially of said shank, means for holding said collar in adjusted position on said shank, and a latch element mounted on said body for movement into the path of said shoulders whereby to limit rotation of said shank relative to said body.

7. In a hook having a tubular swivel body and a hook member rotatably mounted in said body, interengaging means on said body and said hook member for limiting the hook member to a predetermined substantial partial rotative movement relative to said body, comprising means on said hook member forming a plurality of abutment shoulders spaced circumferentially a substantial distance and extending substantially radially thereof in the region of said body, and a latch element on said body opposite said shoulders mounted for movement into a position between said shoulders, said latch element occupying substantially less than the entire circumferential space between any two of said shoulders when moved into position therebetween.

BURT S. MINOR.

REFERENCES CITED

The following references are of record in the file of this patent:

UNITED STATES PATENTS

| Number | Name | Date |
|---|---|---|
| 1,806,908 | Long | May 26, 1931 |
| 1,845,707 | Green | Feb. 16, 1932 |
| 1,922,386 | Minor | Apr. 15, 1933 |
| 2,196,460 | Hertel | Aug. 9, 1940 |
| 2,215,049 | Minor | Sept. 17, 1940 |
| 2,338,349 | Nicolson et al. | Jan. 4, 1944 |
| 2,506,593 | Hertel et al. | May 9, 1950 |